United States Patent Office 3,445,446
Patented May 20, 1969

3,445,446
PROCESS AND CATALYST FOR POLYMERIZING BUTADIENE OR ISOPRENE WHEREBY THE CATALYST IS COMPOSED OF AN ORGANOALUMINUM COMPOUND, IODINE, AND TiX$_2$ OR TiX$_3$ COMPLEXED WITH FATTY ACID AMIDES
Ralph C. Farrar, Bartlesville, Okla., assignor to Phillips Petroleum Company, a corporation of Delaware
No Drawing. Filed Jan. 19, 1966, Ser. No. 521,505
Int. Cl. C08d 1/14, 3/06, 3/10
U.S. Cl. 260—94.3       8 Claims

ABSTRACT OF THE DISCLOSURE

Polymers of 1,3-butadiene or isoprene having a high cis content are prepared by a catalyst which forms on mixing (1) an organoaluminum compound, (2) iodine, and (3) a complex which forms on mixing titanium dichloride or titanium trichloride with fatty acid amides.

---

This invention relates to an improved process for producing polymers. In one aspect, this invention relates to an improved process for producing polymers of butadiene or isoprene. In another aspect, this invention relates to a novel catalyst system for polymerizing butadiene or isoprene.

It is known to polymerize butadiene or isoprene in the presence of a catalyst formed on mixing an organoaluminum compound, iodine, and titanium tetrachloride. The polymer produced in such a system usually contains a high percentage of cis-1,4 addition. If titanium dichloride or titanium trichloride is substituted for the titanium tetrachloride, it is difficult to produce polymer in substantial yields.

An object of this invention is to provide a process for polymerizing butadiene or isoprene. Another object of this invention is to provide a process for producing polymers of butadiene or isoprene that have a predominantly cis structure. Still another object of this invention is to provide a novel catalyst system for polymerizing butadiene or isoprene.

Other objects, aspects, and advantages of this invention will be apparent to those skilled in the art from the following disclosure and claims.

According to my invention, polymers of butadiene and isoprene, having a high percentage of cis configuration, can be prepared by use of a novel catalyst system. The novel catalyst is formed by mixing an organoaluminum compound, iodine, and a complex formed by combining titanium dichloride or titanium trichloride with N,N-dialkyl fatty acid amides.

The organoaluminum compounds employed in the catalyst system of my invention can be represented by the formula R$_3$Al wherein R is a saturated acyclic, saturated cyclic, or aromatic radical containing from 1 to 20 carbon atoms. The following compounds are illustrative of suitable organoaluminum compounds used in my invention: trimethylaluminum, triethylaluminum, triisobutylaluminum, tri-n-decylaluminum, tri-seceicosylaluminum, tribenzylaluminum, triphenylaluminum, tri-1-naphthylaluminum, tri-4-tolylaluminum, tricyclohexylaluminum, tri-(4-methylcyclohexyl)aluminum, tri(4 - butylcyclohexyl)aluminum, tri(4-cyclohexylbutyl)aluminum, and the like.

The N,N-dialkyl fatty acid amides that are used in my invention can be represented by the formula:

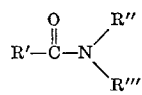

wherein R' is an acyclic hydrocarbon radical containing from 5–19 carbon atoms and R'' and R''' are alkyl radicals containing from 1–10 carbon atoms. The N,N-dialkyl-fatty acid amides can be used singly or in mixtures of two or more of these compounds when forming the complex with the titanium halide. Specific examples of suitable amides that can be used in my invention include the following: N,N - dimethylcaproamide, N,N-dimethylcaprylamide, N,N-dimethylcapramide, N,N-dimethyllauramide, N,N - dimethylmyristamide, N,N - dimethylpalmitamide, N,N-dimethyloleamide, N,N - dimethyltridecanamide, N,-N-dimethylpentadecanamide, N,N - dimethyl-2-hexenamide, N,N - dimethyleicosanamide, N-ethyl-N-decylmyristamide, N,N-dioctyltridecanamide, N-octyl-N-propylpentadecanamide, N,N - dipropylcapramide, and N,N-dihexylcapramide. Various mixtures of the foregoing amides are marketed by the C. P. Hall Company and designated as Hallcomids.

The amide-titanium chloride complex is prepared by simply mixing the titanium chloride and the amide together. The titanium dichloride or titanium trichloride and the N,N-dialkyl fatty acid amide can be brought together either in the presence or absence of a hydrocarbon diluent. Generally, the fatty acid amides used in my invention will be in the form of a liquid and the titanium dichloride or titanium trichloride will dissolve in the amide to form the complex. In some instances, it may be desirable to add some type of hydrocarbon diluent to the complex formation step. Examples of suitable diluents are paraffinic, cycloparaffinic and aromatic hydrocarbons. The amide and the titanium chloride are agitated and allowed to stand for a period of time ordinarily in the range of about 15 minutes to about 100 hours. When the complex formation step takes place in the presence of a hydrocarbon diluent, it may be necessary to allow the mixture to stand for a period of time longer than 100 hours, in order to produce the complex. Any solid material that settles from the mixture of amide and titanium chloride can be readily separated from the soluble portion which is used as the catalyst component. The temperature for preparing the complex can vary from 20° C. or lower to 200° C. or higher. The ratio of the amide to titanium chloride is generally in the range of from 1 to 10 mols of amide per mol of titanium chloride with 1 to 5 mols of amide per mol of titanium chloride being preferred. After the complex has been formed between the amide and the titanium chloride, I have found it to be desirable to add a liquid hydrocarbon diluent.

The mol ratio of the organoaluminum compound to titanium halide in the catalyst system is generally in the range of from 2:1 to 100:1. The mol ratio of the titanium halide to iodine is from 0.005:1 to 10:1. The concentration of the catalyst used in the polymerization process can vary over a wide range. The catalyst level is generally in the range of about 1–20 gram millimoles of the organoaluminum compound per 100 grams of monomer to be polymerized. The actual catalyst level used will in general be determined by the molecular weight of the product which is desired.

In accordance with my invention, 1,3-butadiene or isoprene can be polymerized to produce a rubbery polymer containing predominantly cis-1,4 addition. Generally, the cis content of the polybutadiene made in accordance with my invention will be above 85 percent. The cis content of the polyisoprene produced in accordance with my invention will generally be above 55 percent.

The polymerization is ordinarily conducted by bringing the catalyst components and the monomer together and causing the reaction to proceed in equipment of the type ordinarily used in the art for diene polymerization. The polymerization is conducted at a temperature in the range of −100 to 250° F., with −30 to 160° F. being preferred.

I have found that it is often desirable, from the standpoint of good heat transfer and control of reaction mixture viscosity, to conduct the polymerization in the presence of a diluent or solvent for the monomer and polymer. Suitable diluents and solvents are hydrocarbons which are liquid under reaction conditions. In general, these hydrocarbons are selected from the group consisting of paraffinic, cycloparaffinic, and aromatic hydrocarbons. Examples of suitable diluents are benzene, toluene, xylene, cyclohexane, methylcyclohexane, pentane, hexane, and the like. Mixtures of the foregoing diluents can also be used. The following examples will illustrate some of the preferred embodiments of my invention. The examples should not be construed as unduly limiting the scope of my invention as hereinbefore described. Determinations of microstructure of polybutadiene and inherent viscosity in the examples were made by the procedures shown in U.S. Patent 3,215,682. In the tables, mhm refers to gram millimoles per 100 grams of monomer. Determinations of microstructure of polyisoprene were made by the procedure shown in U.S. 3,159,587.

Example I

Butadiene was polymerized in a series of runs in the presence of a catalyst formed on mixing triisobutylaluminum, iodine, and a complex compound formed by reacting titanium dichloride ($TiCl_2$) with an N,N-dimethylamide derived from a mixture of $C_{12}$ to $C_{16}$ fatty acids (Hallcomid M–14, C.P. Hall Co.). The composition of the N,N-dimethylamide was as follows:

| Component: | Weight percent |
|---|---|
| N,N-dimethyllauramide | 2 |
| N,N-dimethylmyristamide | 95 |
| N,N-dimethylpalmitamide | 3 |

Toluene was charged to the reactor first after which it was purged with nitrogen. Butadiene was added followed by styrene (when used), then the triisobutylaluminum, iodine, and finally the titanium chloride·amide complex. The polymerization recipes and results are presented in Table I.

The $TiCl_2$·amide complex used in run 1 was prepared in 100 ml. of toluene by combination of 4.19 millimoles of $TiCl_2$ with 8.38 millimoles of the amide components. The mixture was agitated and allowed to stand about 65 hours. A considerable quantity of solid material settled leaving a dark green solution. The soluble portion was employed as the titanium component of the initiator. It was analyzed for titanium and the concentration calculated at 0.026 molar in titanium. The $TiCl_2$·amide complex used in runs 2 through 4 was prepared by mixing 5.80 millimoles (0.6880 grams) of titanium dichloride with 11.60 millimoles (3.42 ml.) of amide composition and heating the mixture at 104° C. for 10 minutes. Toluene (112.6 ml.) was then added and the mixture was heated at 70° C. for three hours. It was then filtered through an extra-fine sintered filter (under nitrogen). The blue-green solution phase was employed as the titanium component of the initiator.

The $TiCl_2$·amide complex used in runs 5 through 8 was prepared by mixing 4.87 millimoles (0.5787 grams) of titanium dichloride with 19.48 millimoles (5.75 ml.) of the amide composition and heating the mixture at 104° C. for 10 minutes. Toluene (91.6 ml.) was then added, the mixture was heated at 70° C. for three hours, and filtered as before. The solution phase was used as the initiator.

At the conclusion of the polymerization reaction period, each mixture was shortstopped with a solution of 2,2′-methylene-bis(4-methyl-6-tert-butylphenol), which functioned as an antioxidant, in a mixture of equal volumes of isopropyl alcohol and toluene. The amount of the solution used was sufficient to provide about one part by weight of the antioxidant per 100 weight parts of polymer. The polymer was then coagulated in isopropyl alcohol, separated, and dried.

Styrene was charged in runs 3, 6, and 8. The refractive index values of the polymer show that it did not polymerize but was present as a cosolvent. Consequently the initiator level, based on the total amount of butadiene and styrene charged, was higher than in the other runs since the only compound that behaved as a monomer was butadiene.

The results of the various runs are shown in Table I.

TABLE I

|  | 1 | 2 | 3 | 4 | 5 | 6 | 7 | 8 |
|---|---|---|---|---|---|---|---|---|
| 1,3-butadiene, grams | 100 | 100 | 75 | 100 | 100 | 75 | 100 | 75 |
| Styrene, grams |  |  | 25 |  |  | 25 |  | 25 |
| Toluene, grams | 1,200 | 860 | 860 | 860 | 860 | 860 | 860 | 860 |
| Triisobutylaluminum, mhm | 5.00 | 5.00 | 5.00 | 5.00 | 5.00 | 5.00 | 5.00 | 5.00 |
| $TiCl_2$·amide complex, ml | [1] 20 | 20 | 20 | 20 | 10 | 10 | 10 | 10 |
| Iodine, mhm | 0.80 | 0.80 | 0.80 | 0.80 | 0.80 | 1.60 | 0.80 | 1.60 |
| Temperature, °F | 86 | 122 | 122 | 158 | 122 | 122 | 158 | 158 |
| Time, hours | 18 | 21.5 | 21.5 | 21.5 | 17.5 | 17.5 | 17.5 | 17.5 |
| Conversion, percent | 16 | 33 | 33 | 50 | 14 | 41 | 22 | 56 |
| Inherent viscosity | 2.22 | 2.88 | 2.56 | 2.61 | 3.51 | 3.79 | 3.41 | 3.15 |
| Gel, percent |  | 15 | 0 | 3 | 2 | 0 | 3 | 0 |
| Refractive index |  | 1.5226 | 1.5222 | 1.5219 | 1.5223 | 1.5223 | 1.5217 | 1.5223 |
| Microstructure, percent: |  |  |  |  |  |  |  |  |
| Cis | 85.2 | 87.9 | 91.1 | 93.2 |  | 93.7 |  | 92.9 |
| Trans | 1.3 | 4.4 | 2.1 | 4.1 |  | 1.2 |  | 1.7 |
| Vinyl | 13.5 | 7.7 | 6.8 | 2.7 |  | 5.1 |  | 5.4 |

[1] Solution analyzed for titanium; concentration calculated at 0.026 molar in Ti; amount $TiCl_2$ charged was 0.52 mmole.

The data show that the complex compound of $TiCl_2$ with an N,N-disubstituted fatty acid amide can be employed as an initiator component with an organoaluminum compound and iodine to produce polybutadiene with a cis content upwards of 85 percent.

Example II

Butadiene was polymerized in a series of runs in the presence of a catalyst formed on mixing triisobutylaluminum, iodine, and a complex compound formed by reacting titanium trichloride ($TiCl_3$) with an N,N-dimethylamide derived from a mixture of $C_{10}$ to $C_{14}$ fatty acids (Hallcomid M–12, C. P. Hall Co.). The titanium trichloride was produced by reducing titanium tetrachloride with hydrogen. The composition of the N,N-dimethylamide mixture was as follows:

| Component: | Weight percent |
|---|---|
| N,N-dimethylcapramide | 2 |
| N,N-dimethyllauramide | 95 |
| N,N-dimethylmyristamide | 3 |

The procedure was essentially that described in Example I. The $TiCl_3$·amide complex was prepared by the combination of titanium trichloride with the amide composition in a ½ mol ratio using the procedure described for runs 2 to 4 of Example I. Data are presented in Table II.

TABLE II

|  | 1 | 2 | 3 | 4 |
|---|---|---|---|---|
| 1,3-butadiene, grams | 100 | 100 | 100 | 75 |
| Styrene, grams |  |  |  | 25 |
| Toluene, grams | 1,200 | 1,200 | 1,200 | 1,200 |
| Triisobutylaluminum, mhm | 3.0 | 5.00 | 2.50 | 2.50 |
| TiCl₃·amide complex, ml | 20 | 10 | 10 | 10 |
| Iodine, mhm | 0.80 | 1.60 | 0.80 | 0.80 |
| Temperature, ° F | 41 | 122 | 122 | 122 |
| Time, hours | 17 | 5.75 | 5.75 | 5.75 |
| Conversion, percent | 37 | 73 | 96 | 70 |
| Inherent viscosity | 1.71 | 2.35 | 2.83 | 2.34 |
| Gel, percent | 0 | 0 | 0 | 0 |
| Refractive index |  | 1.5214 | 1.5213 | 1.5214 |
| Microstructure, percent: |  |  |  |  |
| Cis | 94.7 | 93.3 | 92.6 | 92.7 |
| Trans | 2.4 | 2.4 | 3.3 | 3.4 |
| Vinyl | 2.9 | 4.3 | 4.3 | 3.9 |

The results demonstrate that polybutadiene with a high cis content is obtained when a TiCl₃·amide complex is employed as a catalyst component.

Example III

The following recipe was employed for the polymerization of isoprene using the TiCl₃·amide complex of Example II:

TABLE III

| Isoprene, parts by weight | 100 |
|---|---|
| Toluene, parts by weight | 1200 |
| Triisobutylaluminum, mmoles | 5.0 |
| Iodine, mmoles | 1.6 |
| TiCl₃·amide complex, ml. | 5 |
| Temperature, ° F. | 122 |
| Time, hours | 96 |
| Conversion, percent | 27 |

The procedure was essentially that employed in Example I. Results were as follows:

| Inherent viscosity | 0.99 |
|---|---|
| Gel, percent | 0 |
| Microstructure, percent (raw values): |  |
| Cis | 72.0 |
| 3,4-addition | 11.4 |

The data show that the polyisoprene was predominantly of cis configuration.

Example IV

A series of runs was made to polymerize butadiene in the presence of a catalyst system containing a complex of titanium trichloride and a mixture of N,N-dialkyl fatty acid amides. The complex was formed by reacting 3.7 gram millimoles of titanium trichloride with 13.6 gram millimoles of the N,N-dialkyl fatty acid amide composition described in Example II at 100° C. for 20 minutes. After the initial heating step, 100 ml. of toluene was added and the temperature was maintained at 70° C. for 3 hours. The mixture was filtered and the soluble portion of the mixture was used as the catalyst component for the polymerization of butadiene. In the polymerization recipe, 100 parts by weight of 1,3-butadiene and 1200 parts by weight of toluene were used. The other ingredients were variable. The polymerization was carried out at 122° F. for 16 hours. The charge order for the components to the polymerization reactor was as follows: toluene - nitrogen purge-butadiene-triisobutylaluminum-iodine-TiCl₃·amide complex. At the conclusion of the reaction period, the polymerization mixture of each run was shortstopped with a solution of 2,2'-methylene-bis(4-methyl-6-tert-butylphenol) in a mixture of equal volumes of isopropyl alcohol and toluene. The amount of the solution used was sufficient to provide about 1 part by weight of antioxidant per 100 parts by weight of polymer. The polymer was then coagulated in isopropyl alcohol, separated and dried. The following table shows the polymerization recipes and results:

TABLE IV

|  | 1 | 2 | 3 | 4 |
|---|---|---|---|---|
| Triisobutyl aluminum, mhm | 5 | 5 | 5 | 2.5 |
| TiCl₃·amide complex, mhm [1] | 0.37 | 0.19 | 0.09 | 0.09 |
| Iodine, mhm | 0.8 | 0.8 | 0.8 | 0.4 |
| Conversion | 98.4 | 91.9 | 97.9 | 95.1 |
| Inherent viscosity | 3.62 | 4.21 | 5.04 | 6.99 |

[1] Based on titanium trichloride.

The foregoing data show high conversion of butadiene to polybutadiene using the catalyst composition of my invention. The resulting polymers were gel free.

It will be apparent to those skilled in the art that various modifications of this invention can be made without departing from the scope and spirit thereof.

I claim:

1. A process for polymerizing a monomer selected from the group consisting of 1,3-butadiene and isoprene which comprises contacting said monomer with a catalyst which forms on mixing components comprising (1) an organoaluminum compound having the formula $R_3Al$ wherein R is a saturated acyclic, saturated cyclic or aromatic radical containing from 1–20 carbon atoms, (2) iodine, and (3) a complex which forms on mixing at least one titanium halide selected from the group consisting of titanium dichloride and titanium trichloride and at least one amide having the structural formula

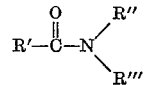

wherein R' is an acyclic hydrocarbon radical containing from 5–19 carbon atoms and R'' and R''' are alkyl radicals containing from 1 to 10 carbon atoms, thereby forming polybutadiene containing at least 85 percent cis 1,4 addition or polyisoprene containing at least 55 percent cis 1,4 addition.

2. The process of claim 1 wherein said contacting occurs at a temperature of from about −100 to 250° F.

3. The process of claim 2 wherein said mixing occurs at a temperature of from about 20° to 200° C. for a period of from about 15 minutes to about 100 hours.

4. The process of claim 3 wherein the mol ratio of said amide to said titanium halide is from 1:1 to 10:1, the mol ratio of said organoaluminum compound to said titanium halide is from 2:1 to 100:1, the mol ratio of said titanium halide to iodine is from 0.005:1 to 10:1 and the amount of catalyst present is from 1 to 20 gram millimoles of organoaluminum compound per each 100 grams of said monomer charged to the polymerization system.

5. The process of claim 4 wherein said amide comprises a mixture of N,N-dimethyllauramide, N,N-dimethylmyristamide and N,N-dimethylpalmitamide.

6. The process of claim 4 wherein said amide comprises a mixture of N,N-dimethylcapramide, N,N-dimethyllauramide and N,N-dimethylmyristamide.

7. The method of claim 5 wherein said titanium halide is titanium dichloride and said organoaluminum compound is triisobutylaluminum.

8. The method of claim 6 wherein said titanium halide is titanium trichloride and said organoaluminum compound is triisobutylaluminum.

References Cited

UNITED STATES PATENTS 3,189,590 6/1965 Coover et al. _____ 260—93.7
3,206,447 9/1965 Zelinski _____ 260—94.3

FOREIGN PATENTS 940,125 10/1963 Great Britain.

JOSEPH L. SCHOFER, Primary Examiner.

R. A. GAITHER, Assistant Examiner.

U.S. Cl. X.R.

252—429